sequentially numbered
3,442,637
GRANULATION OF SEWAGE SLUDGE

John W. Hudson, Atlanta, and Gerald D. Ferguson, Decatur, Ga., assignors, by mesne assignments, to USS Agri-Chemicals, Inc., Pittsburgh, Pa., a corporation of Delaware
No Drawing. Filed July 21, 1965, Ser. No. 473,852
Int. Cl. C05f *13/00, 7/00;* C05c *3/00*
U.S. Cl. 71—12            10 Claims

ABSTRACT OF THE DISCLOSURE

Fertilizer ingredients including sewage and bran fibers are mixed with nitrogen solution, ammonia and steam, and the blended mixture granulated to form hot granules. The granules while hot and wet are mixed with cottonseed meal and starch whereby the oil-rich particles of the meal coat the granules to provide an attrition-resistant fertilizer.

---

This invention relates to granular mixed fertilizer, and more particularly to a fertilizer containing slowly-soluble nitrogen coated with cottonseed meal. The invention is useful in the preparation of a fully-granular, attrition-resistant fertilizer containing organic nitrogen, derived from raw materials such as sewage sludge and cottonseed meal.

In prior practice, fertilizers for use on tobacco fields and similar uses employed dry cottonseed meal mixed with other dry, raw materials containing organic nitrogen. Various components of such fertilizers, because of the wide distribution of particle sizes and densities, segregate prior to and during application on the field, and the cottonseed meal itself does not have prolonged adherence to the other solid particles.

There has long been a need for the tobacco grower and the like to have a fully-granular, attrition-resistant fertilizer containing organic nitrogen, derived from raw materials such as sewage sludge and cottonseed meal.

We have discovered that a fully-granular, attrition-resistant fertilizer containing slowly-soluble nitrogen can be prepared by first blending and granulating all of the active ingredients except the cottonseed meal, and then applying a mixture of cottonseed meal and starch to the hot, wet granules prior to drying, cooling and screening the product. We have further discovered that the fibers and hulls from the screening operation can be recycled to the blending stage and incorporated in the granules to reinforce the granules. By this action, attrition resistance is imparted to the granules. When the meal and starch mixture contacts the hot, wet granules, the fine oil-rich particles in the meal coat the granules which have already been reinforced by incorporation therein of finely-ground fibers and hulls (bran).

A primary object, therefore, is to prepare a granular mixed fertilizer having the above-described properties. A further object is to provide a process for the preparation of a fully-granular, attrition-resistant fertilizer containing organic nitrogen and cottonseed meal. Other specfic objects and advantages will appear as the specification proceeds.

In one embodiment of our invention, dry ingredients of the fertilizer, including sewage sludge and the ground fibers and hulls of cottonseed meal, are fed to an ammoniator and thereto are added nitrogen solution, steam and/or water, and sulfuric acid. A conventional ammoniator-granulator may be employed, and the nitrogen solution, steam, and sulfuric acid may be fed through spargers into the rolling bed in the ammoniator. The material is discharged from the ammoniator into the granulator, into which is introduced cottonseed meal with a small amount of starch. The cottonseed meal contacts the hot, wet granules which have a temperature of about 200° F., and the oil-rich particles in the meal coat the granules. The product is then fed to a screen and the fibers and hulls are screened out of the coated product. The fibers and hulls are in a fine condition, as, for example, sufficiently small to pass a 16-mesh screen, and then recycled to the ammoniator for incorporation in the granules where they act as reinforcing agents. By this process, the product contains no fractured particles, and the granule has a surface coating of cottonseed meal, imparting a golden color and a distinctive odor to the attractive, closely-sized granules.

The amount of starch may vary, but we prefer to employ a minimum amount in the proportion of about 3 to 5 percent based on the weight of the cottonseed meal. The amount of cottonseed meal per ton of product may vary also, but we prefer to employ about 5 to 10 percent of the cottonseed meal by weight based on the final product. Excellent results have been obtained by using 7 percent by weight of the cottonseed meal and starch. By way of example, we have obtained an excellent product using 5 pounds of cornstarch per 150 pounds of cottonseed meal per ton of fertilizer product.

The granules of the resulting product had a golden color imparted by cottonseed meal bonded to the outer surface of the granules, and the granules were reinforced by ground fiber and hulls (bran) of the cottonseed meal. Attrition tests consisted of passing all of the product through a pilot plant, a treatment which is as severe as the treatment fertilizer receives when passing through a bagging mill, and the granules remained firm and withstood such treatment, with the cottonseed meal remaining firmly bonded to the outer surface of the granules.

Specific examples illustrative of the process may be set out as follows:

EXAMPLE I

In a pilot plant, sewage sludge and recycled fiber and ground hulls of cottonseed meal were pre-blended in a dry mixer and then fed to an ammoniator by a weigh-belt feeder. Nitrogen solution, steam, and water were fed through one sparger and sulfuric acid through another, the spargers being placed side by side under the rolling bed in the ammoniator-granulator. The ammoniator-granulator was of the TVA type (2 ft. diameter by 4 ft.) and divided into an ammoniating section 12 in. long and a granulating section 36 in. long. A 6 in. deep rolling bed was maintained in the ammoniator by an annular sheet metal dam. The discharge of the granulator did not have a retaining ring, resulting in a minimum bed depth in the granulator. The flows of steam, water, and sulfuric acid were controlled by rotameters and needle valves. The nitrogen solution was controlled by a magnetic flowmeter. The cottonseed meal was fed by means of a vibrating feeder. The material was heated in the ammoniator to a temperature of about 200° F.

Five pounds of cornstarch mixed with 150 pounds of cottonseed meal were added to the hot granules discharged from the ammoniator, forming one ton of product. The starch was added as dry starch, and the strength of the starch was developed in the presence of heat and moisture encountered during the early stages of drying.

The mixed materials were then fed to a screen and oversized particles were repeatedly returned to the cage mill until ground sufficiently to pass a 16-mesh screen and were then fed into the recycle stream.

The product was subjected to attrition tests which consisted of passing all of the product through the complete pilot plant, and it was found that the granules remained firm during such severe treatment. The incorporation into the granules of the ground fibers and hulls rendered the closely-sized granules infrangible during such treatment.

EXAMPLE II

The following experimental formulas were made up in which the various ingredients of the fertilizer were first blended and granulated and thereafter cottonseed meal and starch were added as indicated to the hot granules. Such formulas on the basis of pound-per-ton of product are set out as follows:

TABLE.—LB./TON OF PRODUCT

| 370-F N-Soln | Chicago sludge | Nitrate of soda-potash | 20% ROP super-phosphate | Muriate of potash | Sulfate of potash-magnesia | Sulfate of potash | Dolo-mite | Borax | Sand | $H_2SO_4$, 60° Bé. | Kemidol | Coating (cotton seed meal) | Coating (starch) |
|---|---|---|---|---|---|---|---|---|---|---|---|---|---|
| 95 | 90 | 80 | 910 | 73 | 7 | 238 | 118 | 2 | 158 | 100 | 38 | 150 | 5 |
| 95 | 90 | 80 | 910 | 73 | 27 | 238 | 118 | 2 | 173 | 75 | 29 | 150 | 5 |

The products produced in the above tests were comparable to those described in Example I.

While in the foregoing specification we have set out embodiments of the invention in considerable detail for the purpose of illustrating the invention, it will be understood that such details may be varied widely by those skilled in the art without departing from the spirit of our invention.

We claim:
1. In a process for preparing granular fertilizer, the steps of blending and granulating fertilizer ingredients including sewage sludge and water to form granules, and then coating said granules with cottonseed meal and starch and heating the starch to develop a strong adhesive bond between the granules and cottonseed coating.

2. The process of claim 1 in which the coated product is screened to separate fiber and hulls and said fiber and hulls recycled to said blending step for admixture with the fertilizer ingredients.

3. In a process for preparing granular fertilizer, the steps of blending and granulating the fertilizer ingredients including sewage sludge with cottonseed fiber and bran to form granules, coating said granules with cottonseed meal and starch and heating the starch to develop the adhesive strength of the starch.

4. The process of claim 3 in which said starch is added in the proportion of about 3–5 percent by weight based on said cottonseed meal.

5. In a process for preparing granular fertilizer, the steps of blending dry sewage sludge with ground cottonseed fiber and hulls to form a bed, introducing into the mixture sulfuric acid, ammonia solution and steam, rotating the bed to form hot granules, and coating the hot granules at a temperature of about 200° F. with cottonseed meal and starch.

6. The process of claim 5 in which the starch is about 3–5 percent by weight of the cottonseed meal.

7. In a process for preparing granular fertilizer, the steps of blending and granulating dry sewage sludge and ground cottonseed fiber and hulls to form a bed, sparging into the mixture nitrogen solution, anhydrous ammonia, sulfuric acid and steam, rotating the bed to form hot granules, and coating the hot granules at a temperature of about 200° F. with cottonseed meal and starch.

8. The process of claim 7 in which the product is screened to separate the fiber and hulls from the product and the fiber and hulls recycled to the blending step for admixture with said sewage sludge.

9. As a new composition of matter, attrition-resistant fertilizer granules containing slowly-releasing organic fertilizer nitrogen in the form of sewage sludge and coated with cottonseed meal and starch.

10. As a new composition of matter, attrition-resistant fertilizer granules consisting essentially of organic fertilizer nitrogen in the form of sewage sludge and cottonseed fiber and bran, said granules being coated with cottonseed meal and starch.

References Cited

UNITED STATES PATENTS

| 2,307,253 | 1/1943 | Yee et al. | 23—102 |
| 2,369,110 | 2/1945 | Harford | 71—64 |
| 2,669,510 | 2/1954 | Dresser | 71—64 |
| 3,050,383 | 8/1962 | Wilson | 71—11 |

DONALL H. SYLVESTER, *Primary Examiner.*

T. G. FERRIS, *Assistant Examiner.*

U.S. Cl. X.R.

71—11, 13, 23, 64; 117—100